United States Patent
Betts et al.

(10) Patent No.: US 7,895,299 B2
(45) Date of Patent: Feb. 22, 2011

(54) DYNAMIC LINKS IN CONTENT-BASED NETWORKS

(75) Inventors: Craig Betts, Kanata (CA); David Pochopsky, Ottawa (CA); Martin Barnes, Kanata (CA); Greg Bertin, Ottawa (CA); Peter Ashton, Nepean (CA); Wayne Burwell, Ottawa (CA)

(73) Assignee: Solace Systems, Inc., Ottawa, ON (CA)

( * ) Notice: Subject to any disclaimer, the term of this patent is extended or adjusted under 35 U.S.C. 154(b) by 1446 days.

(21) Appl. No.: 11/012,098

(22) Filed: Dec. 16, 2004

(65) Prior Publication Data
US 2005/0138038 A1 Jun. 23, 2005

Related U.S. Application Data

(60) Provisional application No. 60/530,676, filed on Dec. 19, 2003.

(51) Int. Cl.
*G06F 15/177* (2006.01)
(52) U.S. Cl. ............... 709/220; 709/241; 370/230; 370/237; 370/238; 370/400
(58) Field of Classification Search ............... 709/220, 709/221, 241; 707/10; 370/400, 401, 465, 370/254, 395, 230, 237, 238, 252, 389; 715/513
See application file for complete search history.

(56) References Cited

U.S. PATENT DOCUMENTS

| | | | |
|---|---|---|---|
| 6,021,443 A | 2/2000 | Bracho et al. | |
| 6,091,724 A | 7/2000 | Chandra et al. | |
| 6,321,219 B1 * | 11/2001 | Gainer et al. | 1/1 |
| 6,594,268 B1 * | 7/2003 | Aukia et al. | 370/400 |
| 6,801,502 B1 * | 10/2004 | Rexford et al. | 370/235 |
| 2002/0023165 A1 * | 2/2002 | Lahr | 709/231 |
| 2002/0126698 A1 * | 9/2002 | Deshpande | 370/467 |
| 2003/0009585 A1 * | 1/2003 | Antoine et al. | 709/238 |
| 2003/0035430 A1 * | 2/2003 | Islam et al. | 370/401 |
| 2003/0099237 A1 | 5/2003 | Mitra et al. | |
| 2003/0126136 A1 * | 7/2003 | Omoigui | 707/10 |
| 2004/0010752 A1 * | 1/2004 | Chan et al. | 715/513 |

OTHER PUBLICATIONS

Carzaniga, A. et al.; "A Routing Scheme for Content-Based Networking"; University of Colorado, Department of Computer Science Technical Report; Jun. 2003; University of Colorado, Boulder, Colorado, U.S.A.
Arbouzov, L. et al.; Exensible Markup Language (XML) 1.0 (Third Edition); Feb. 4, 2004; W3C.
Arbouzov, L. et al.; "Extensible Markup Language (XML) 1.1"; Apr. 15, 2004; W3C.
"XML Path Language (XPath)"; Nov. 16, 1999; W3C.

* cited by examiner

*Primary Examiner*—Thuong T Nguyen
(74) *Attorney, Agent, or Firm*—Marks & Clerk; Richard J. Mitchell

(57) ABSTRACT

In a method of managing a content-based network including a plurality of content routers, such as XML routers, dynamic links are established between the content routers which are not direct neighbors.

19 Claims, 3 Drawing Sheets

DYNAMIC LINKS IN CONTENT-BASED NETWORKS

CROSS REFERENCE TO RELATED APPLICATION

This application claims the benefit under 35 USC 119(e) or prior U.S. provisional application Ser. No. 60/530,676 filed Dec. 19, 2003, the contents of which are incorporated herein by reference.

FIELD OF THE INVENTION

This invention relates to content-based networks, in particular, but not exclusively, to Extensible Markup Language (XML) routing in such networks.

BACKGROUND OF THE INVENTION

Content-based networks are described in A Carzaniga, M. J. Rutherford, A. L. Wolf, A routing scheme for content-based networking, Department of Computer Science, University of Colorado, June 2003, the contents of which are incorporated herein by reference.

In Extensible Markup Language (XML) routing, a network of XML routers exists as an overlay on top of a traditional IP routed network. The XML routers communicate with each other via Transmission Control Protocol (TCP) sockets. A socket in this context is an endpoint of a two-way communication link between two programs running on the network. These TCP sockets are formed between XML routers that are considered "neighbors". The neighbor relationships are created by the network administrator, by configuring the IP address and TCP port number of the adjacent XML router. The communication path (i.e. TCP socket) between neighbors is named a "static XML link".

FIG. 1 shows a sample content routed network 1. The network 1 consists of a plurality of publishers 2, 3 and 4, a plurality of subscribers 5, 6 and 7, 16 and a plurality of content routers 8, 9, 10, and 11. A content router is a digital communications networking device which forwards content based on inspection of the contents of a message or document, rather than on an explicit destination address in the networking header of a packet or frame. An example of such a device is the XCR 3200 XML content router from Solace Systems, Inc. A publisher is a computer, user or device that can insert content into the network. Another name commonly used in the literature is an event source or a producer. A subscriber is a computer, user or device that has expressed interest in some specific content. Another name commonly used in the literature is event displayers or consumers. In network 1, routers 8 and 9 are neighbors, via the static XML link 12. Similarly, router 8 and router 11 are neighbors via static link 15, routers 9 and 10 are neighbors via static link 13, and routers 10 and 11 are neighbors via static link 14.

The XML Link State Protocol (XLSP) is a link state protocol designed specifically for XML routed networks. It operates between XML routers, and is used to discover and resolve the routed topology consisting of XML routers and XML static links. The XML Subscription Management Protocol (XSMP) is used to propagate and manage content subscriptions throughout the XML routed topology. After subscription information has been propagated, the XSMP utilizes the topology discovered by the XLSP to create a "subscription tree". The subscription tree defines the path that XML documents will take through the network from a given publisher to a set of subscribers. This subscription tree always traverses a set of XML routers and XML static links discovered by the XLSP. XLSP and XSMP are fully described in co-filed application Ser. No. 60/530,615, the contents of which are incorporated herein by reference.

For information on XML, refer to "Extensible Markup Language (XML) 1.0 (Third Edition)", W3C Recommendation Feb. 4, 2004, W3C (World Wide Web consortium) and "Extensible Markup Language (XML) 1.1", W3C Recommendation Apr. 15, 2004, W3C. For content routing with XML, an example of suitable subscription syntax is XML Path Language (XPath) (refer to reference "XML Path Language (XPath) Version 1.0", W3C Recommendation Nov. 16, 1999, W3C (Word Wide Web Consortium)).

The methods described above allow the network administrator to build a highly scalable, efficient and robust XML routed network. However, each XML router incurs delay and in some circumstances may present a performance bottleneck.

SUMMARY OF THE INVENTION

The invention offers a more efficient method for delivering some traffic using of "dynamic XML links". The dynamic XML links can be used to reduce the number of XML router hops the customer data traverses, thereby reducing delay and increasing overall network throughput.

In a broad aspect therefore the invention provides a method of managing a content-based network including a plurality of content routers, comprising at an originating router examining an incoming document to identify a destination router for said document, said originating router and said destination router forming a pair of routers; establishing at least one dynamic link between said pair of routers when said destination router is not a direct neighbor of said originating router; and transferring documents over said at least one dynamic link.

It will be understood that the term "document" in the context of this application is used in the most general senses and includes any entity containing content, for example, including multimedia content, that is capable of being published to subscribers.

Embodiments of the invention permit the network administrator to control customer traffic such that some class of identifiable XML documents can be passed through the network with a minimal number of XML router hops (i.e. higher priority traffic which requires reduced delay); some portion of XML traffic can be directed through a path other than that which is resolved by the XLSP/XSMP, for the purpose of off-loading a congested node or avoiding a "network hot spot"; and some TCP connections can be established only on an "as needed" basis, so that network resources are minimized when dealing with intermittent or sporadic traffic patterns.

Embodiments of the invention provide a set of techniques for maintaining dynamic links between XML routers, including procedures for establishment; procedures for glare handling; and procedures for aging and/or tear-down.

Embodiments of the invention also provide a method for provisioning and configuring dynamic XML links and a set of techniques for ensuring that dynamic and static XML links can co-exist in a common XML routed network.

In another aspect the invention provides a content routed network, comprising a plurality of content routers interconnected by static links; one or more publishers connected to said content routed network; a plurality of subscribers connected to said content routed network; and said content routers being configured to establish a dynamic link between a pair of said content routers which are not direct neighbors wherein documents received from said one or more publishers can be transferred over said dynamic link.

BRIEF DESCRIPTION OF THE DRAWINGS

The invention will now be described in more detail, by way of example only, with reference to the accompanying drawings, in which.

DETAILED DESCRIPTION OF THE PREFERRED EMBODIMENTS

Dynamic XML links are communication paths established between XML routers which are not direct neighbors. They can be used to reduce the delay between a given publisher and subscriber, perform traffic engineering by bypassing some percentage of traffic away from network congestion points, and increase the scalability of the network by reducing the number of TCP sockets which need be open at a single time.

A dynamic XML link can be considered a "shortcut" between two XML routers which are not directly connected by a static XML link. XML documents traversing a dynamic XML link bypass one or more XML routers in the overlay topology.

Figure 1:
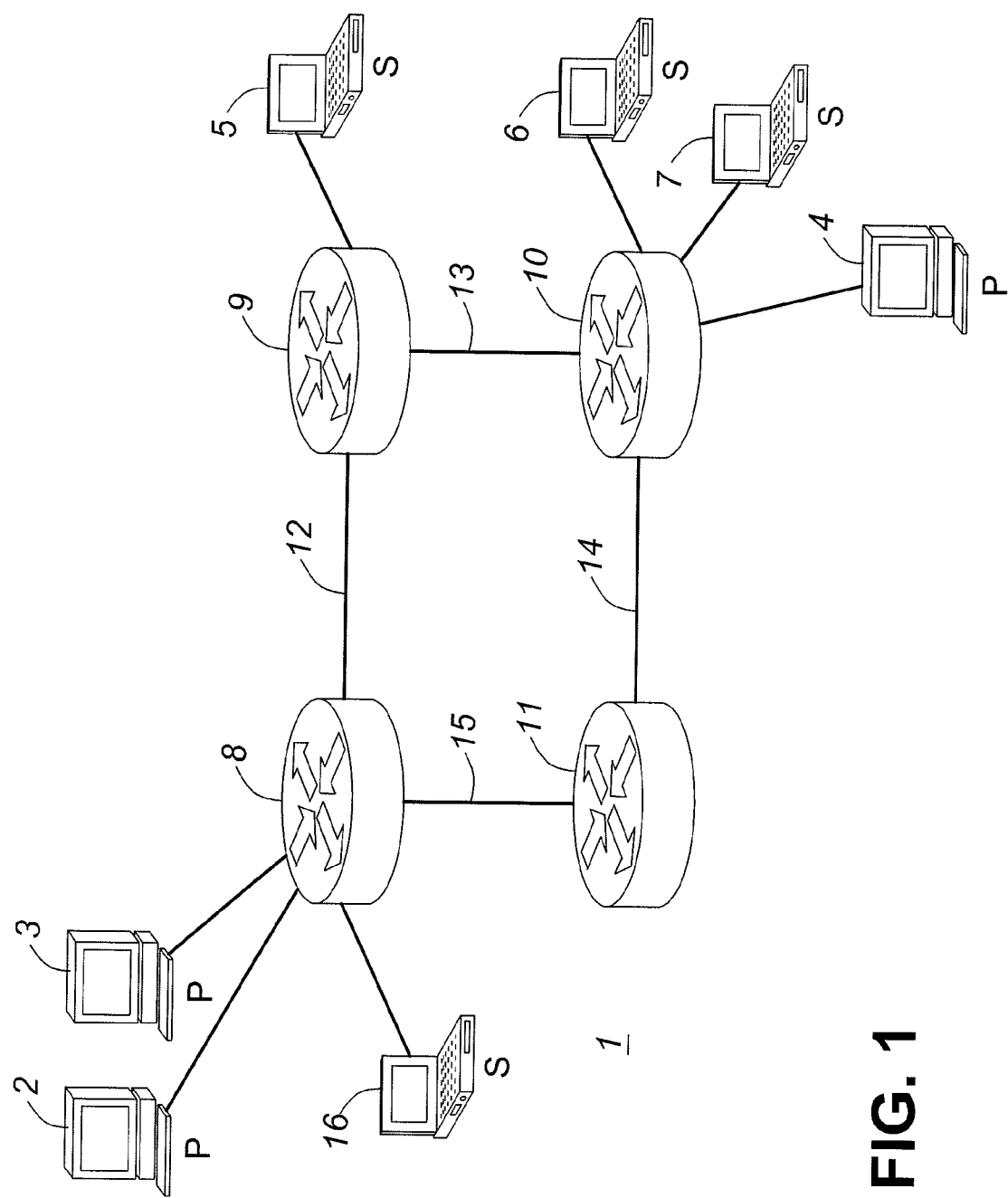
FIG. 1 shows a Static XML Routed Network.

Consider the static XML network depicted in FIG. 1. If publisher 2 is publishing data into the network which subscriber 6 has subscribed to, the path would be from the publisher 2 to router 8, over link 15 to router 11, over link 14 to router 10, and finally to subscriber 6. This example path is selected by the XML routing protocols referenced above. An alternate path would be publisher 2 to router 8, over link 12 to router 9, over link 13 to router 10, and finally to subscriber 6. The method of choosing the path to use is disclosed in the above-referenced filing Ser. No. 60/530,615.

By adding a dynamic XML link configuration at router 8 for some set of XML documents forwarded from publisher 2 to subscriber 6, router 8 will establish a direct TCP connection to router 10 on an as needed basis.

Figure 2:
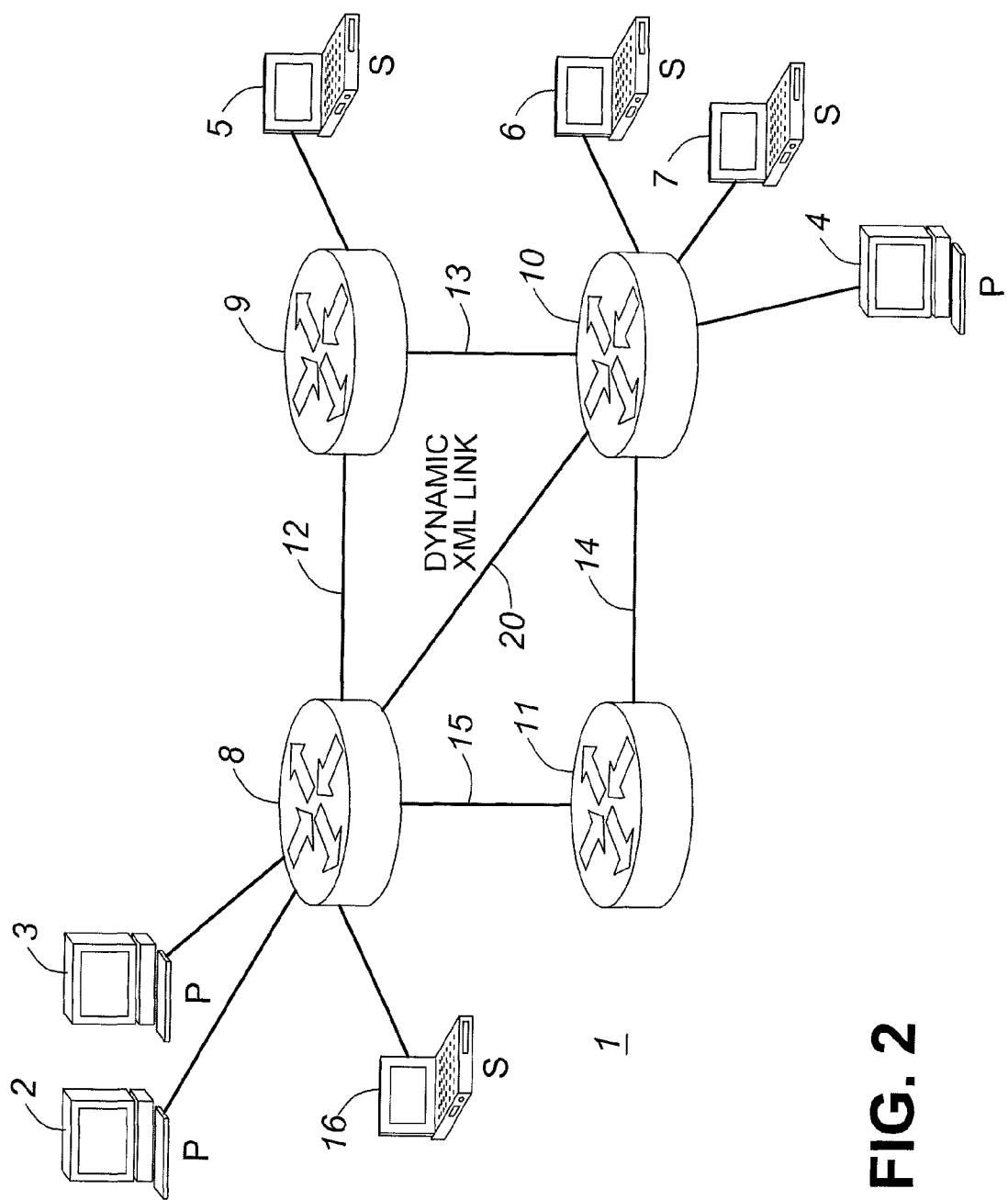
FIG. 2 shows an XML Routed Network with Dynamic Link.

FIG. 2 shows the same elements as FIG. 1, with common elements sharing the same label. In FIG. 2, there is an additional direct Dynamic XML Link 20 shown between router 8 and router 10. When such a link is established, content published by publisher 2 which has been subscribed to by subscriber 6 can follow the short-cut path: publisher 2 to router 8, over dynamic XML link 20 to router 10, and finally to subscriber 6. Such a path avoids the XML traffic from having to be transited by router 9 or router 11.

For proper network operation, the mechanisms for establishment, maintenance and tear-down of dynamic XML links must be well defined.

Figure 3:
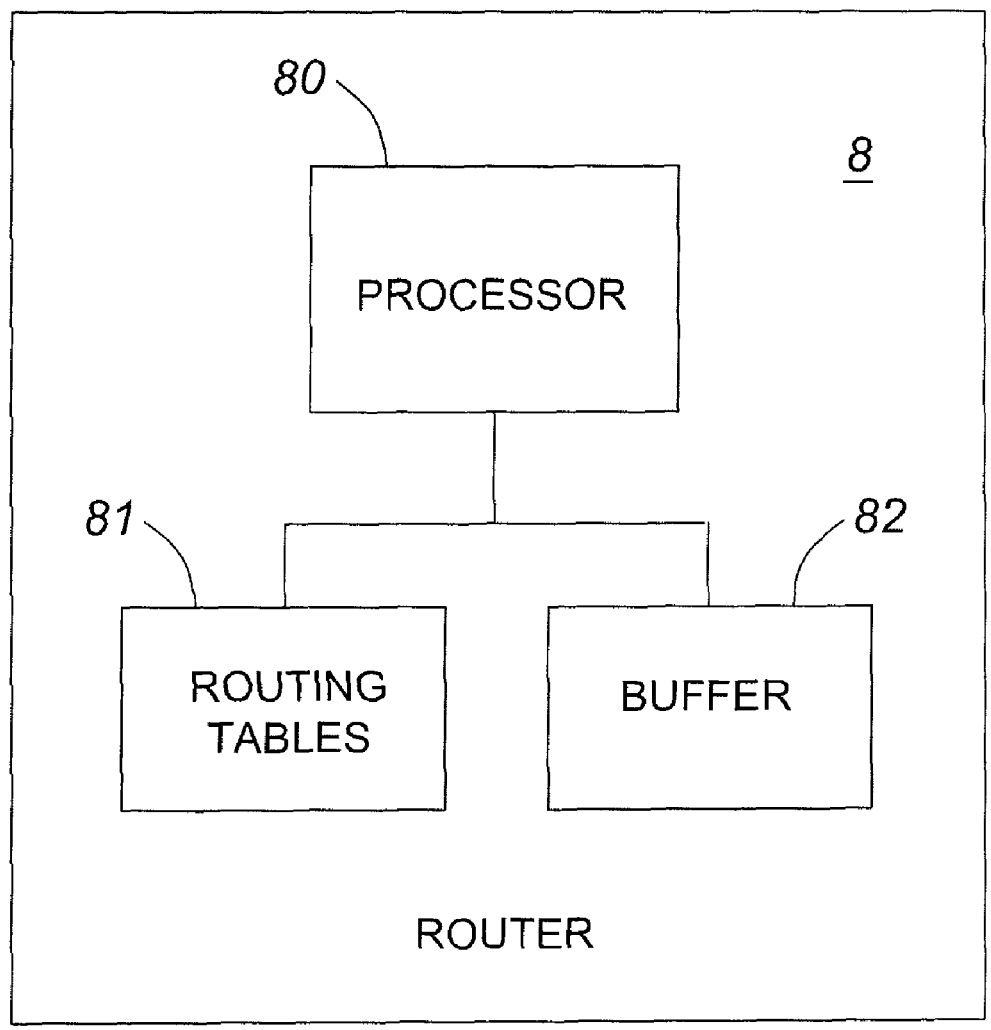
FIG. 3 is a simplified block diagram of a router.

Two options are supported for the establishment of dynamic XML links: a) configuration driven establishment, or b) data driven establishment. When configuration driven establishment is used, the TCP connection is established as soon as the network administrator creates and configures it. For data driven establishment, the router establishes the TCP connection after it receives the first XML document which is required to traverse the dynamic XML link. While the connection is being established, the XML document which-triggered it, and any subsequent documents which are destined for the same dynamic link, must be buffered by the XML router. FIG. 3 shows a typical content router 8 containing a processor 80, routing tables 81, and a buffer 82.

It is possible for two routers to have symmetrical dynamic XML links configured for each other. That is, two routers may need to asynchronously establish TCP connections to each other. For example, in FIG. 2, router 8 may be configured to establish a dynamic XML link to router 10, and router 10 may be configured to establish a dynamic XML link to router 8. If the establishment of these connections occur at well spaced times, then the second connection can be avoided simply by re-using the first connection in both directions. This falls within the spirit of reducing the number of TCP connections in the network. However, it is possible that both routers may be triggered to establish the dynamic link to each other at close time intervals, and create what is known as a "glare" condition. Glare handling of dynamic links is similar to that which is used in other connection oriented networking technologies; which is to elect one of the TCP connections for use, and disconnect the other. The two routers must implement the same election algorithm for determining which connection to retain; otherwise both connections may be torn down. For the dynamic XML links, the TCP connection of the router with the numerically lower IP address is the one which will be torn down. It is the responsibility of the router that established the connection to subsequently tear it down.

The decision to tear down the TCP connection for a dynamic link also has two options: a) aging after lack of use for some time interval T, or b) automatic disconnection after each XML document. It is a configuration option for the network administrator which method of dynamic link tear down is used.

In the first case, aging of the connection is the responsibility of the router which established the connection. If after T seconds, no traffic has been exchanged between the two routers across the dynamic link, the establishing router disconnects it. The dynamic link would then be re-established at a later time as per the establishment rules described above.

In the second case, the TCP connection associated with the dynamic link is torn down after each XML document is sent. The connection would then be re-established at a later time as per the establishment rules described above.

There are two phases to creation and configuration of a dynamic XML link. The first phase consists of the creation of the dynamic link destination; the second phase consists of the creation of the XML filtering rule(s) to identify traffic destined for that link.

The Command Line Interface (CLI) format for creating the dynamic link is:

router [no] link <link_id> address <ip>:<tcp_port> [dscp <dscp>] [AUTO_ESTABLISH] [aging <aging_time>]

where items in square brackets [ ] indicates optional items, items in angle brackets < > indicates parameters, and the optional "no" keyword indicates that the dynamic link configuration is to be deleted. Table 1 below describes the configurable parameters supplied by the network administrator when creating the dynamic link.

TABLE I

Dynamic Link Configuration Parameters

| Parameter | Required/Optional | Description |
| --- | --- | --- |
| <link_id> | Required | A unique identifier for the dynamic link. |

TABLE I-continued

Dynamic Link Configuration Parameters

| Parameter | Required/ Optional | Description |
| --- | --- | --- |
| <dst_router_ip> | Required | The IP address of the XML router at the remote end of the dynamic link. This will be used in the establishment of the TCP connection. |
| <dst_tcp_port> | Required | The TCP port number to use in the establishment of the dynamic link TCP connection. |
| <dscp> | Required | Differentiated Services Code Point to be used for the TCP connection. This allows the TCP connection to utilize the quality of service capabilities of the underlying IP or MPLS network, as described in co-filed patent application 60/588,797, the contents of which are incorporated herein by reference. |
| AUTO_ESTABLISH | Optional | Token specifying that the TCP connection for the dynamic link should be automatically established after configuration. If omitted, then the TCP connection will only be established when data destined for the dynamic link is to be forwarded. |
| <aging_time> | Optional | Time in seconds that the TCP connection must be idle before it will be torn down. If omitted, then the TCP connection is automatically torn down at the end of transmission of each XML document. |

When creating the XML filtering rules for traffic to traverse that link, the user must enter the rule in the form of an XPath Expression (XPE). XPath is described in the above-referenced XPath specification. The CLI format is:

router xsmp [no] dynamic-link-filter xpe <xpe> link <link_id> where the optional "no" keyword indicates that the dynamic link filter rule is to be deleted, <xpe> is the XPath expression string, and <link_id> indicates a dynamic link which was configured using the command defined earlier. It is important to understand that there can be a many-to-one relationship between the filter rules established in step (2) and the dynamic link created in step (1). That is, multiple filter rules can reference the same dynamic link identified by <link_id>.

Clearly, in a single XML routed network, both static and dynamic XML links can and must be allowed to co-exist. For proper network behavior, a number of simple design rules must be followed to allow this co-existence:

1. Dynamic XML links are not affected by or visible to the operation of the XLSP in any way. The consequence of this is that dynamic links are not present in the topology database created by the XLSP. This is done to avoid short-duration dynamic links from causing churn in the topology seen by the routers discovering and monitoring the network topology via XLSP.
2. As a result of 1, dynamic links are not utilized when matching subscriptions advertised via XSMP. Only static XML links, which are present in the XLSP topology database, are used by the XSMP.
3. The Filter rules created to reference dynamic XML links take preference in the classification of XML documents over those learned via the XSMP.

In copending patent application 60/588,797, the contents of which are incorporated herein by reference, the scenario of using HTTP over TCP as the method of communicating between content routers is described. When HTTP over TCP is utilized, a given TCP connection between a pair of content routers can only carry documents in one direction. For example, in FIG. 2, a TCP connection from router 8 to router 9 is used to carry HTTP requests (containing the document to be sent) from router 8 to router 9, and to carry HTTP responses back from router 9 to router 8. A separate TCP connection is established from router 9 to router 8, and is used to carry documents from router 9 to router 8 in an HTTP request, and an HTTP response is sent back over the same TCP connection from router 8 to router 9. In this scenario of using HTTP over TCP, an XML link, such as link 12 between content routers 8 and 9, is actually composed of a pair of TCP connections. Moreover, additional TCP connections can be used, with the concept of document priority, to effect quality of service in a content-routed network. When HTTP over TCP is used and a TCP connection is only used to carry documents in one direction (and responses in the opposite direction), the issue of glare handling described above is not present, and each router can independently set up a TCP connection for a dynamic XML link independently to each other.

When document priorities are utilized as described in 60/588,797, document priorities can also be used as a trigger to set up a dynamic link to another content router. Instead of, or in addition to, using an XPath expression filter to trigger the use of a dynamic XML link as defined above, the document priority assignment algorithm defined in 60/588,797 can be used as a trigger to set up a dynamic link. The CLI format for defining this operation is:

router xsmp [no] priority-filter xpe <xpe> priority <priority> [dynamic-link <link_id>]

where items in square brackets [ ] indicates optional items, items in angle brackets < > indicates parameters, and the optional "no" keyword indicates that the priority filter configuration is to be deleted. <priority> is a document priority in the range of 0 (lowest) to 3 (highest) as defined in 60/588,797; <xpe> is an XPath expression used to match received documents to priorities as explained in 60/588,797; and <link_id> refers to a dynamic XML link configuration as described above. For example, a dynamic XML link can be defined, and use of this link can be specified for highest-priority documents (e.g. priority 3) as determined by an XPath expression. The dynamic XML link will then be used when the document priority classification scheme classifies a document as priority 3. Note that multiple dynamic XML links can be defined to a given destination router, with each link being used by different priorities. Note also that a given dynamic link can be used by more than one document priority, since multiple filters can be assigned to use the same <link_id>. As explained in 60/588,797, a link between a pair of content routers can be made up of a plurality of TCP connections in order to support quality of service. Dynamic links support this; however, each dynamic link represents one such TCP connection so that they can be set up and torn down independently as needed.

As described in the above-referenced filing 60/530,615, the XSMP routing protocol allows a router to know of a summarized view of subscriptions for each other content router in the same routing area, independent of the topology of the routing area. For example, in FIG. 2, content router 8, through XSMP, will discover the summarized subscription set for each of content routers 9, 10 and 11. Because of this scheme, a content router knows of the precise destination content router in a routing area, as opposed to other schemes which summarize subscriptions among content routers and thus this information is not known. For example, with the XSMP algorithm, when a document arrives to content router 8 from publisher 2, content router 8 can determine that the document is required by at least one subscriber on router 9 and on router 10. In other routing schemes, the router would only know that the document is required by router 9 or some unknown set of downstream routers. The XSMP routing algorithm allows for another novel use of dynamic XML links in content routed networks. A content router can measure the document bandwidth (in kilobits per second) independently to each non-neighbor destination content router, and determine if the bandwidth is above a threshold BW setup. If so, a dynamic XML link can be set up directly to that content router. When the measured bandwidth falls below BW teardown, then the dynamic XML link can be torn down. This allows dynamic XML links to set up shortcuts to destination content routers based on the traffic flows seen, with hysteresis provided by the configurable setup and tear-down bandwidth thresholds. Note that the bandwidth measurement above is measuring the amount of document bandwidth destined to each content router, and not the actual bandwidth used on XML links. For example, with the static XML links used in FIG. 2, when content router 8 has a document that is destined to both content routers 9 and 10, a single copy of the document can be sent over link 12 to content router 9, and content router 9 then sends a copy over link 13 to content router 10. However, router 8 can separately track the document bandwidth that it has sent to each content router, independently of the actual path taken.

To enable bandwidth measurement, the dynamic link configuration of Table 1 above is augmented with the additional parameters specified in Table 2 below (and these parameters are added to the CLI command as optional parameters, and if not present, the bandwidth measurement algorithm is not active for that destination content router).

TABLE 2

Additional Dynamic Link Configuration Parameters

| Parameter | Required/ Optional | Description |
| --- | --- | --- |
| <BW_setup> | Optional | The bandwidth threshold, in kilobits per second, for setting up the dynamic XML link. |
| <BW_teardown> | Optional | The bandwidth threshold, in kilobits per second, for tearing-down the dynamic XML link. This value must be less than the <BW_setup> |

In the above description of dynamic links, the published documents are in the form of XML documents, and the subscriptions and dynamic link and priority filters are in the form of XPath expressions. However, this invention is applicable to content routing for non-XML data formats. For example, in the above-referenced "A routing scheme for content-based networking", a published document (also referred to as a message or an event) is in the form of a structured set of attribute/value pairs, and a subscription (also referred to as a selection predicate) is in the form of a logical disjunction of conjunctions of elementary constraints over the values of individual attributes. The above description of dynamic links is applicable to such content-routing networks, with the specification of XPath Expressions above replaced by the specification of selection predicates. In addition, the dynamic links established would carry messages in the form of a structured set of attribute/value pairs instead of in the form of XML documents.

The invention has been described with reference to an exemplary embodiment. It will be appreciated by one skilled in the art that many variants are possible within the scope of the invention.

All references mentioned above are herein incorporated by reference. Reference has been made herein to copending provisional applications, which are incorporated by reference. Such incorporation by reference should also be taken to include the non-provisional applications based thereon whose serial numbers will be inserted when they become available.

We claim:

1. A method of managing a content-based network including a plurality of content XML routers, comprising:

establishing static XML links between neighboring pairs of said content XML routers by forming TCP sockets between said neighboring pairs of content routers to define a network topology as an overlay on top of an underlying IP packet routed network with TCP connections in the packet routed network providing the static XML links in the content routed network;

discovering the network topology of said content based network consisting of said static links with an XML link state protocol;

propagating subscriptions throughout the network topology of said content-based network with an XML subscription management protocol to create a subscription tree that defines a path within the content-based network that incoming XML documents take through the content-based network by matching the content of the incoming document to the subscriptions;

creating a TCP connection in the underlying IP packet routed network to establish at least one dynamic link in the overlaid content-based network that is not present in a network topology database for said content-based network created by said XML link state protocol between an originating router and a destination router in said content-based network forming a pair of content-based routers that are not normally direct neighbors within the content-based network topology as defined by said static links whereby in the presence of said dynamic link said pair of content-based routers in said overlaid content-based network behave as direct neighbors to documents traversing the content-based network so that documents passing between said pair of content-based routers do so in a single hop over said dynamic link, which is created as a TCP connection in said underlying IP packet based network;

establishing XML filtering rules in the form of Xpath expressions to identify traffic destined for said at least one dynamic link in said content-based network;

transferring said traffic complying with said filtering rules over said at least one dynamic link in said content-based network, said XML filtering rules taking precedence over said XML subscription management protocol in the routing of XML documents; and tearing down said dynamic link in said content-based network after use by terminating said TCP connection in said underlying IP packet-based network, and wherein said documents are assigned one or more priorities, multiple dynamic links are established between said pair of content routers, each dynamic link between said pair is associate with one or more different priorities, and each document is transferred over the dynamic link associated with a priority corresponding to the priority assignment of that particular document.

2. The method of claim 1, wherein said dynamic link is established by a network administrator configuring the TCP connection between said pair of content routers.

3. The method of claim 2, wherein said content routers detect a condition when more than one dynamic link is established substantially simultaneously between the same pair of routers, and in response to the detection of said condition tear down one of said dynamic links.

4. The method of claim 3, wherein said content routers tear down the link originating from the content router based on a comparison of the IP addresses of the pair of routers.

5. The method of claim 4, wherein said content routers tear down the link originating from the content router with the lowest IP address.

6. The method of claim 1, wherein dynamic link is created in response to the arrival of an incoming XML document at said originating router destined for said destination router, and said originating router buffers said document initiating the establishment of said dynamic link and any subsequent documents destined for the destination router until they can be transmitted over said dynamic link.

7. The method of claim 1, wherein said documents are assigned one or more priorities and only documents with corresponding priorities are transferred over said dynamic link.

8. The method of claim 7, wherein multiple dynamic links are established between said pair of content routers, each dynamic link between said pair is associated with one or more different priorities, and each document is transferred over the dynamic link associated with a priority corresponding to the priority assignment of that particular document.

9. The method of claim 1, wherein the originating content router determines the bandwidth of a flow of said documents between said originating router and said destination router, and only establishes said dynamic link when said bandwidth exceeds a first predetermined threshold.

10. The method of claim 9, wherein said dynamic link is torn down in the event said bandwidth subsequently falls below a second predetermined threshold.

11. The method of claim 1, wherein said dynamic link is torn down after a predetermined period of time after no traffic has been present on said dynamic link.

12. A content routed network wherein documents are routed through the network between publishers and subscribers based on the content of the documents, the content routed network comprising:
  an underlying IP packet routed network;
  a plurality of content routers defining said content routed network overlaid on said IP network, wherein neighboring pairs of said content routers are interconnected by XML static links terminated at TCP sockets forming TCP connections to define a content routed network topology as an overlay on top of the IP packet routed network with communication paths in the packet routed network providing the static XML links in the content routed network and wherein an XML subscription management protocol propagates subscriptions throughout the content routed network topology to create a subscription tree that defines a path that incoming XML documents take through the network by matching the content of the incoming document to the subscriptions;
  one or more publishers connected to said content routed network;
  a plurality of subscribers connected to said content routed network, said subscribers being associated with subscriptions identifying which documents are to be received from said one or more publishers; and
  said content routers being configured to create a TCP connection in the packet routed network to establish at least one dynamic link that is not present in a network topology database for said content-routed network created by said XML link state protocol between an originating router and a destination router forming a pair of routers that are not direct neighbors within said static network topology as defined by said static links whereby in the presence of said dynamic link said pair of content routers behave as direct neighbors to documents traversing the content based network so that documents passing between said pair of content routers do so in a single hop over said dynamic link; to establish XML filtering rules in the form of Xpath expressions to identify traffic destined for said at least one dynamic link whereby traffic complying with said filtering rules is transferred over said at least one dynamic link, said XML filtering rules taking precedence over said XML subscription management protocol in the routing of XML documents; and
  to tear down said dynamic link after use; and
  wherein said documents are assigned one or more priorities and said content routers are configured to establish multiple dynamic links between said pair of content routers, each dynamic link between said pair being associated with one or more different priorities, and wherein said content routers are further configured to transfer a particular said document over the dynamic link associated with a corresponding to the priority assignment of that particular document.

13. The content routed network of claim 12, wherein said content routers are configured to detect a condition when more than one dynamic link is established substantially simultaneously between the same pair of routers and tear down one of said links in response to the detection of said condition.

14. The content routed network of claim 13, wherein said content routers are configured to tear down the link originating from the content router by comparing the IP addresses of the originating and destination routers.

15. The content routed network of claim 14, wherein said originating router is configured to create the dynamic link in response to the arrival of an incoming XML document and includes a buffer for storing the document initiating the establishment of said dynamic link and any subsequent documents are destined for the destination router until said documents can be transferred over said dynamic link.

16. The content routed network of claim 12, further comprising a filter selecting the documents to be transferred over said dynamic link.

17. A content router for use in a content routed network wherein documents are routed through the network between publishers and subscribers based on the content of the documents, comprising
  a plurality of content-based routes, and
  wherein pairs of said content-based routers are interconnected by XML static links to define a content-routed network topology as an overlay on top of an IP packet routed network with TCP connections in the packet routed network providing the static XML links in the content routed network and wherein an XML subscription management protocol propagates subscriptions throughout the content-routed network topology to create a subscription tree that defines a path that incoming XML documents take through the content-routed network by matching the content of the incoming document to the subscriptions; one or more publishers are connected to said content routed network; and a plurality of subscribers are connected to said content routed network, said content router being configured to create a path in the packet routed network to establish at least one dynamic link that is not present in a network topology database for said content-routed network created by said XML link state protocol between an originating router and a destination router forming a pair of routers that are not normally direct neighbors within said content routed network topology as defined by said static links, whereby in the presence of said dynamic link said pair of content routers behave as direct neighbors to documents traversing the network so that documents passing between said pair of content routers do so in a single hop over said dynamic link;

to establish XML filtering rules in the form of Xpath expressions to identify traffic destined for said at least one dynamic link whereby traffic complying with said filtering rules is transferred over said at least one dynamic link, said XML filtering rules taking precedence over said XML subscription management protocol in the routing of XML documents; and to tear down said dynamic link after use; and wherein said documents are assigned one or more priorities and said content router is configured to establish multiple dynamic links between said pair of content routers, each dynamic link between said pair being associated with one or more different priorities, and wherein said content router is further configured to transfer a particular said document over the dynamic link associated with a priority corresponding to the priority assignment of that particular document.

18. The router of claim 17, which is configured to detect a condition when more than one dynamic link is established substantially simultaneously between the same pair of routers and tear down one of said links in response to the detection of said condition.

19. The router of claim 17, which is configured to set up said dynamic link in response to a determination that the bandwidth usage between said originating router and said destination router exceeds a predetermined threshold.

* * * * *